US006050546A

United States Patent [19]

Peschmann et al.

[11] Patent Number: 6,050,546

[45] Date of Patent: Apr. 18, 2000

[54] SMALL VEHICLE LIFT

[75] Inventors: Joseph J. Peschmann, Plover; Michael Roll, Wausau, both of Wis.

[73] Assignee: Fulton Performance Products, Inc., Mosinee, Wis.

[21] Appl. No.: 09/143,935

[22] Filed: Aug. 31, 1998

[51] Int. Cl.[7] ........ B60P 1/48

[52] U.S. Cl. ........ 254/10 B; 254/7 R

[58] Field of Search ........ 254/10 B, 7 R, 254/7 C, 10 C, 126

[56] References Cited

U.S. PATENT DOCUMENTS

| | | |
|---|---|---|
| 1,261,633 | 4/1918 | Shuford . |
| 1,941,301 | 12/1933 | Hanson et al. . |
| 2,468,230 | 4/1949 | Pollard . |
| 2,587,094 | 2/1952 | Berg et al. . |
| 2,696,970 | 12/1954 | Hill . |
| 2,975,868 | 3/1961 | Long . |
| 3,935,600 | 2/1976 | Scribner . |
| 4,180,252 | 12/1979 | Cushenbery . |
| 4,405,116 | 9/1983 | Eisenberg . |
| 4,681,299 | 7/1987 | Siebert . |
| 5,072,955 | 12/1991 | Holland et al. . |
| 5,131,628 | 7/1992 | Huang . |
| 5,379,855 | 1/1995 | Juang . |
| 5,518,224 | 5/1996 | Anderson . |

*Primary Examiner*—David A. Sherbel
*Assistant Examiner*—Daniel G. Shanley
*Attorney, Agent, or Firm*—Craig A. Fieschko, Esq.; DeWitt Ross & Stevens S.C.

[57] ABSTRACT

A small vehicle lift of the parallelogram type is described wherein parallel pivoting legs are pivotally attached at their opposing ends to a base and a support platform, whereby the lift ranges from a lowered state wherein the support platform is in close parallel relation to the base and a raised position wherein the support platform is in spaced parallel relation to the base. Both the support platform and the base pivotally bear the legs within channels and thereby surround the legs at opposing planes adjacent the planes wherein the legs pivot. The channels within the base also have wheels rotatably mounted therein to allow the lift to be easily transported. Two opposing pivoting legs are affixed together by a bridge member which is pivotally connected to a linear actuator, which is in turn pivotally connected to the base. Actuation of the linear actuator thereby raises and lowers the support platform with respect to the base. The bridge member is situated nearer the upper leg ends than the lower leg ends to provide greater mechanical advantage.

19 Claims, 3 Drawing Sheets

SMALL VEHICLE LIFT

FIELD OF THE INVENTION

This disclosure concerns an invention relating generally to vehicle lifts, and more specifically to parallelogram lifts wherein a series of parallel pivoting legs is used to lift a platform whereupon a vehicle is situated.

BACKGROUND OF THE INVENTION

Parallelogram lifts, wherein a series of parallel legs are pivotally mounted between a base and a support platform, are well known for lifting small vehicles such as motorcycles, all-terrain vehicles, snowmobiles, and the like. These lifts, which are exemplified by U.S. Pat. No. 5,518,224 to Anderson, may be actuated from a lowered state wherein the support platform, pivoting legs, and base are all adjacently situated in substantially parallel relation to a raised state wherein the platform is spaced in parallel relation from the base by the pivoting legs.

These prior lifts are subject to several disadvantages. Initially, they tend to be configured so that substantial force must be initially applied to the lifts to begin elevating the support platform with respect to the base. The Anderson patent illustrates a typical arrangement wherein the actuator used to push the pivoting legs upward acts on an attachment point on the pivoting legs adjacent the base of the lift. If the kinematics of this arrangement are analyzed, it is seen that this arrangement requires very high actuating force to be applied at the attachment point in order to begin pivoting the legs. In effect, if the pivoting legs are viewed as levers which pivot at a fulcrum at the base, this arrangement situates the actuating force nearer the fulcrum and thereby requires an actuating force of greater magnitude. As a result, lifting is initially difficult and it then becomes easier as lifting progresses. When a user applies a constant actuating force to the lift, this tends to cause the lift to initially elevate slowly and then speed up as the support platform nears its fully raised position. This can be problematic because the sudden stop experienced when the support platform reaches its fully raised position can then upset the vehicle on the support platform. Additionally, because of the high actuation forces that need to be exerted on the attachment point on the pivoting legs, the actuating mechanism and its linkages to the attachment point must be heavily reinforced in order to avoid excessive wear and possible failure. This requires that heavier (and more expensive) components be used, or alternatively that the rated weight capacity of the lift be limited so that failure does not occur from overloading.

Further, many prior lifts use “simple” pivot arrangements wherein a pin is simply inserted in turn through the pivoting legs and then through the base, and similarly through the pivoting legs and then the support platform. The pivoting legs then pivot in planes adjacent to the pin-connected members in the base and support platform. Such arrangements, as exemplified by Anderson, exert high shear forces on the pin. As a result, these pins and their surrounding components must be reinforced (leading to greater expense) or the rated weight capacity of the lift must be decreased. Additionally, such simple pivot arrangements decrease the overall rigidity of the lift in planes perpendicular to the planes wherein the pivoting legs rotate, thereby increasing the tendency of the support platform to wobble in these perpendicular planes.

In addition, lifts such as Anderson’s are difficult to properly situate beneath vehicles because they lack wheels or other components allowing them to be easily relocated on the ground. Some prior lifts bear wheels, but these are generally mounted to the lifts by extending a plate from the top of the lift’s base in cantilever fashion, and then affixing the wheels beneath the plate. Since the entire weight of the lift and vehicle must be supported by the wheels, the cantilevered plate, and the adjoining section of the base, these components must be fortified to avoid failure. This is particularly true of the plate, which can sag or bend when the lift is loaded and cause the lift to “bottom out” on the ground. If the plates are severely overloaded, they can fail and cause the lift’s base to fall to the floor, which can in turn cause the vehicle to be dislodged from the support platform to fall to the ground. The cantilevered arrangement can be avoided by simply mounting wheels to the bottom of the base, but this tends to increase the height of the lift to an unacceptable degree owing to the increased difficulty in fitting the lift under low vehicles.

SUMMARY OF THE INVENTION

The invention, which is defined by the claims set out at the end of this disclosure, is directed to an improved parallelogram lift for small vehicles and other objects which overcomes the disadvantages noted above, and which also provides higher lift capacity without the need for heavier and expensive components. In preferred embodiments of the lift, the lift includes a base with two pairs of parallel runners. Within each pair of runners, the runners are spaced in parallel relation to define a base channel within the pair. Two pairs of parallel pivoting legs are also provided, and each leg pair has the lower leg ends of its pivoting legs pivotally mounted in spaced relation in one of the base channels. Two support members are then provided whereupon the upper leg ends of each leg pair are pivotally mounted to one support member in spaced relation. Preferably, the support members have support member channels formed along their lengths wherein the upper leg ends are pivotally mounted. An upper bridge member extends between the pairs of pivoting legs and connects to one pivoting leg within each pair, thereby restraining these pivoting legs to pivot together. Each pair of pivoting legs acts as a parallelogram linkage in combination with its pivotally connected runner pair within the base, and with its pivotally connected support member. Owing to the upper bridge member restraining its attached pivoting legs in coacting fashion, all pivoting legs pivot together between a lowered state wherein the support members are adjacent to the base runners, and a raised state wherein the support members are spaced distant from the base runners. Because the pivoting legs are pivotally affixed within channels in the base and channels in the support members, with the pivoting legs being mounted in the base and support members in clevis-like fashion, greater rigidity is provided and lesser shear stress is generated in the connecting pins. As a result, the lift components do not need to be greatly reinforced and the cost of the lift is decreased, and/or the rated weight capacity of the lift is increased. Where the base runners, pivoting legs, and support members are made of metal tubing or metal channel, additional strength can be inexpensively imparted by inserting bearing sleeves within the pivoting legs through which pivot pins ride to be inserted within the pin apertures in surrounding runners and support members. This arrangement has been found to make the lift substantially more rigid and wear-resistant than prior lift arrangements wherein pins are simply extended through pin apertures in the tubular/channel pivoting legs and then through adjacent base and support platform members.

In the foregoing arrangement, the upper bridge member is preferably attached to the pivoting legs nearer to their upper leg ends than to their lower leg ends, and most preferably at or adjacent to their upper leg ends. A linear actuator, e.g., a screw actuator, is then attached between the upper bridge member and the base so that extension and retraction of the linear actuator pushes the upper bridge member away from or toward the base, thereby raising and lowering the support members. As a result of the attachment of the bridge member near the top of the pivoting legs, unlike prior lift arrangements, lesser actuating force is required when the support members are initially elevated. Additionally, when a constant actuating force is applied, the pivoting speed of the pivoting legs will decrease as the support members are elevated, rather than increase. As a result, a vehicle resting on the support members is less likely to be jarred from the support platform when the support platform stops at its fully elevated position. Further, because less actuating force is required, the linear actuator, upper bridge member, and associated components need not be reinforced, and/or the weight-bearing capacity of these components (and the overall lift) is increased.

Lifting is also made easier where the aforementioned upper bridge member includes one or more outwardly-protruding upper pivot members to which the linear actuator is pivotally affixed, wherein these upper pivot members extend away from the plane defined by the upper bridge member and its connected pivoting legs. Most preferably, the upper pivot members extend away from this plane at an approximately perpendicular angle, e.g., between 60°–120°, and extend to pivotally connect to the linear actuator in a direction substantially parallel to the direction of extension/retraction of the linear actuator, e.g., by no more than 30° off of this direction. As a result of this arrangement, the force of the linear actuator (which is directed along its line of extension/retraction) is always transmitted to the pivoting legs at an angle substantially perpendicular to the pivoting legs, thereby more efficiently lifting the legs.

Within the lift described above, wheels are preferably rotatably mounted within the base channels formed between the runner pairs. By situating the wheels within the base channels wherein the pivoting legs pivot, the wheels can support substantially more weight (or can be formed substantially lighter) than when wheels are supported from the base off of cantilevered plates, as in prior lifts. This arrangement is also advantageous in that the overall base area occupied by the lift is less than when cantilevered wheels are used, and the lift is therefore easier to insert within smaller spaces beneath vehicles.

Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
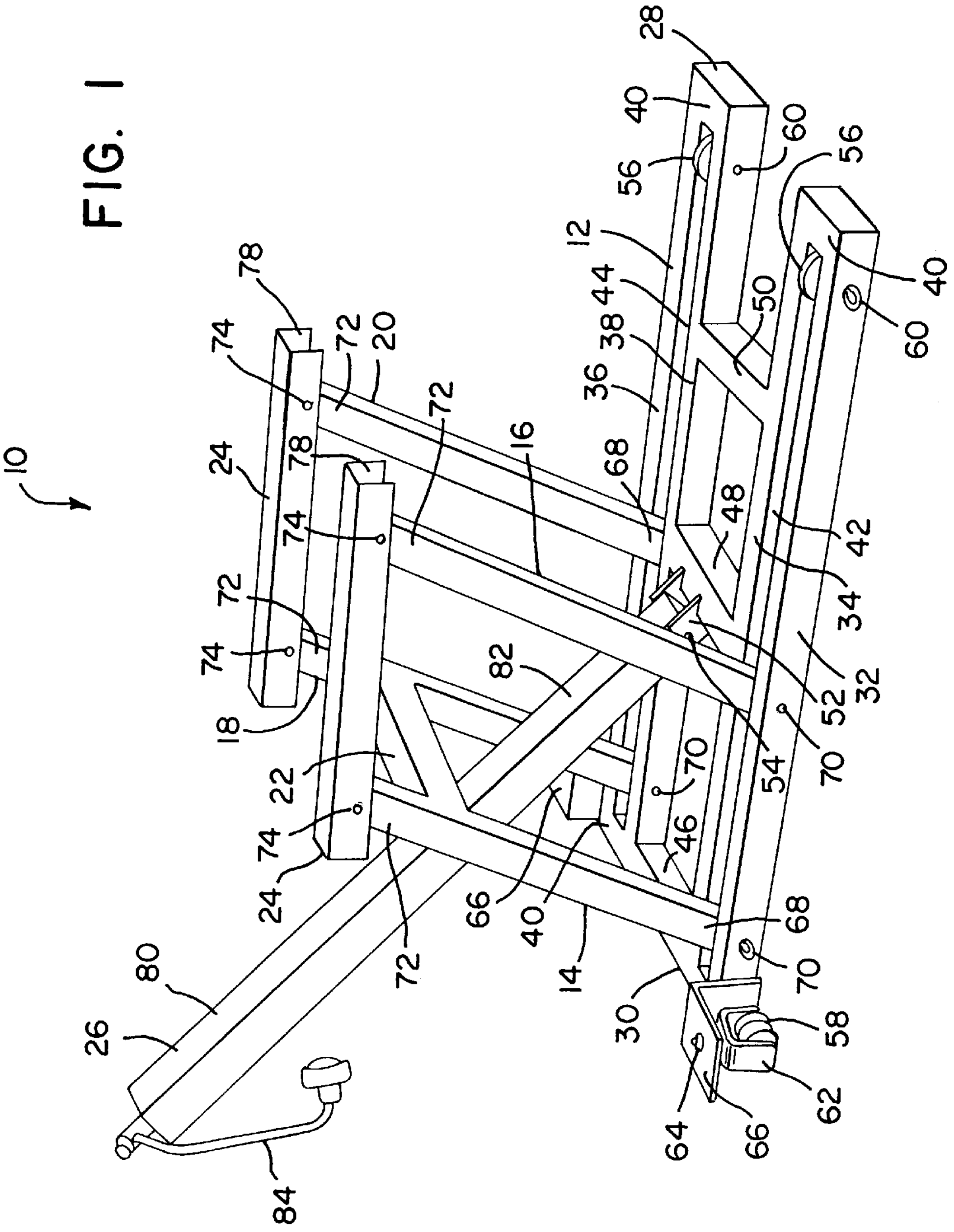
FIG. 1 is a side perspective view of a preferred embodiment of a vehicle lift in accordance with the invention.

In the drawings, wherein the same or similar features of the invention are designated in all Figures with the same reference numerals, a preferred embodiment of a vehicle lift is accordance with the invention is designated generally by the reference numeral 10. The vehicle lift 10 includes a base 12; two pairs of pivoting legs, the first pair including rear leg 14 and front leg 16 and the second pair including rear leg 18 and front leg 20, all of which are pivotally affixed to the base 12; an upper bridge member 22 connecting rear legs 14 and 18 to restrain them in coactuating fashion (i.e., pivoting of rear leg 14 will similarly cause pivoting of rear leg 18); support members 24 pivotally affixed to the pivoting legs 14, 16, 18, and 20, whereupon a vehicle may be situated; and a linear actuator 26 (e.g., a screw jack) pivotally affixed to the base 12 and the upper bridge member 22, whereby actuation of the linear actuator 26 extends and retracts the upper bridge member 22 away from and toward the base 12 to lift and lower the support members 24. Each of these components will now be discussed in turn in greater detail.

The base 12 includes two pairs of runners extending between a front end 28 of the vehicle lift 10 and a rear end 30, wherein the first pair of runners includes an outer runner 32 and an inner runner 34 which are spaced in generally parallel relation. The second pair of runners similarly includes an outer runner 36 and an inner runner 38 spaced in generally parallel relation. The outer runner 32 is maintained in spaced relation from the inner runner 34 by beams 40 located at the front end 28 and rear end 30 of the base 12 to define a base channel 42 resting between the runners 32 and 34. Similarly, the outer runner 36 is maintained in spaced relation from the inner runner 38 by beams 40, thereby defining a base channel 44.

Figure 3:
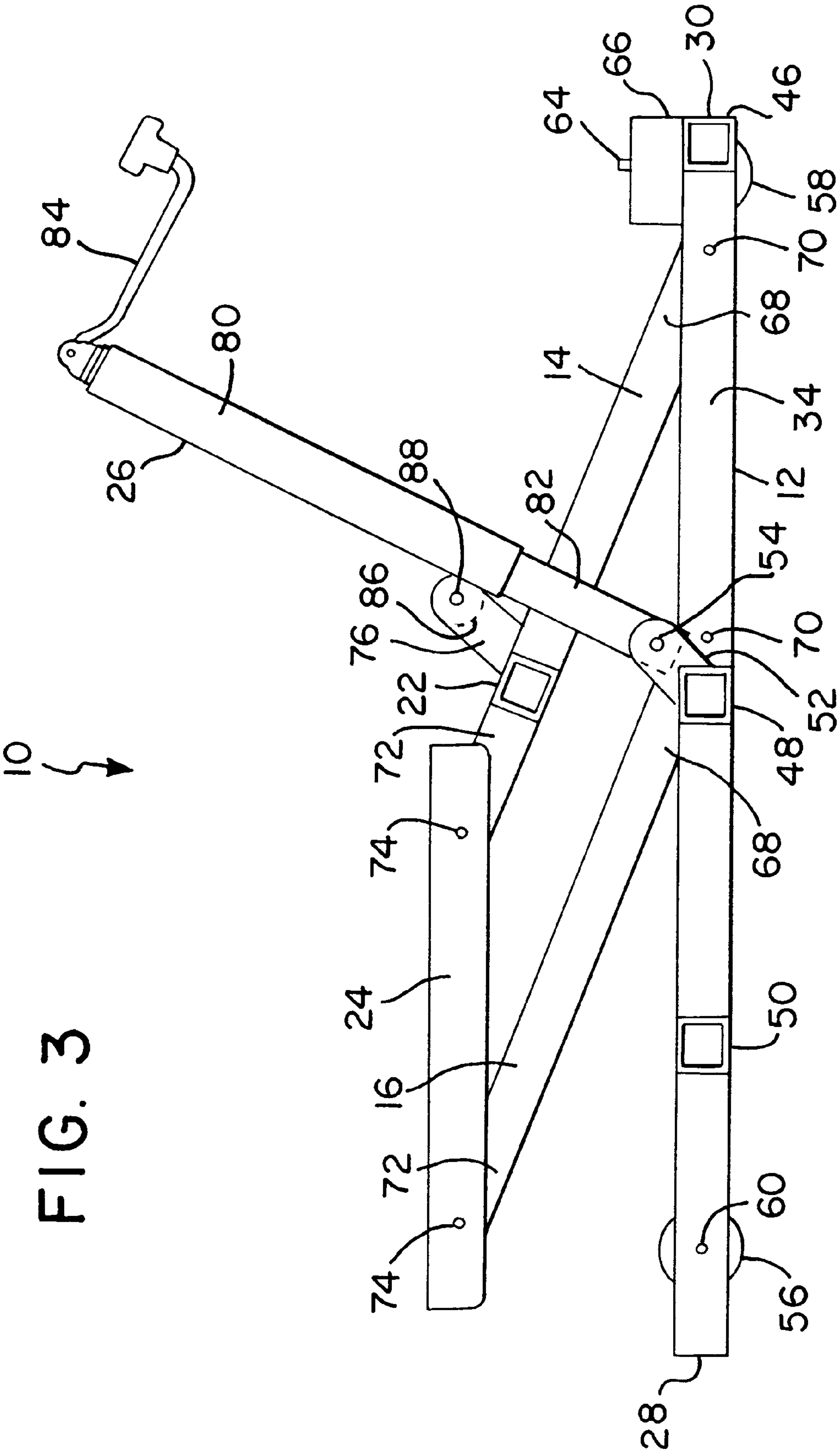
FIG. 3 is a side sectional view of the vehicle lift of FIGS. 1–2, shown from the line 3—3 illustrated in FIG. 2.

Within the base 12, the runner pairs 32/34 and 36/38 are themselves maintained in spaced parallel relation by rear, central, and front lower bridge members 46, 48, and 50 which extend between the inner runner 34 of the first pair of runners and the inner runner 38 of the second pair of runners. The rear lower bridge member 46 is contiguous with the two beams 40 located at the rear end 30 of the base 12. The central lower bridge member 48 is desirably situated approximately midway between the front end 28 and the rear end 30 of the base 12, and it bears a pair of upwardly and rearwardly-extending flange-like lower pivot members 52 between which the linear actuator 26 is pivotally affixed via pin 54 in a clevis-like arrangement. As best seen in FIG. 3, the lower pivot members 52 extend upwardly to such a height that the pivot point defined by pin 54 is situated above the plane defined by the tops of the runners 32, 34, 36, and 38. The front lower bridge member 50, which is optional, is then preferably spaced approximately halfway between the central lower bridge member 48 and the front end 28 of the base 12 to add rigidity.

Figure 2:
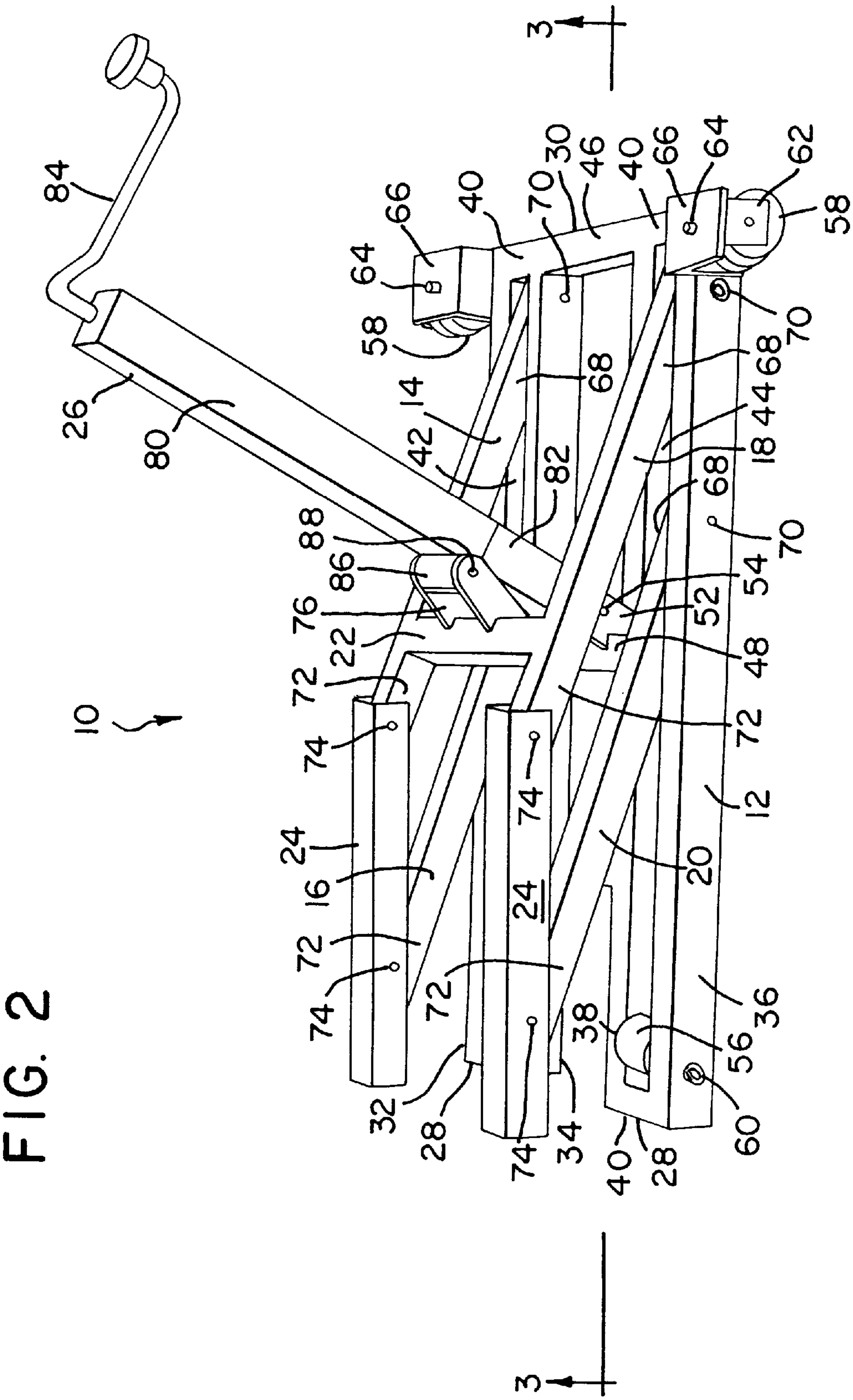
FIG. 2 is a side perspective view of the vehicle lift of FIG. 1, shown from the opposite side.

The base 12 also preferably includes front and rear wheels 56 and 58 located generally near its front and rear ends 28 and 30 to allow the vehicle lift 10 to be more easily rolled from one location to another. The front wheels 56 are preferably rotatably mounted within the base channels 42 and 44 near the front end 28 of the base 12 by extending pins 60 through the outer runners 32/36, the wheels 56, and the inner runners 34/38 (such pins preferably terminating in open eyeloops, as shown in FIGS. 1 and 2, to allow an easy means for tying down the lift 10). The wheels 56 are thereby constrained within the base channels 42/44 to roll in a generally linear direction. The rear wheels 58 are therefore preferably adapted to roll in different directions to allow steering of the lift 10, and this is achieved by mounting them within rear wheel housings 62 which are rotatably mounted via pins 64 to angle members 66. The angle members 66 are affixed near the rear end 30 of the base 12 so that the rear wheels 58 are suspended from the base 12 in cantilever fashion.

Situating the front wheels 56 within the channels 42/44 wherein the pivoting legs 14, 16, 18, and 20—a feature which is not believed to previously exist in the art—is believed to be advantageous for several reasons. Initially, it reduces the "footprint" area of the base 12 to an area less than that required when cantilevered wheels are used, e.g., wheels 58. Lesser area for the front end 28 is desirable because it will better allow the front end 28 to better fit beneath vehicles and between their wheels. Further, the front wheel pins 60, being supported on opposite sides of the wheels 56 by the relatively thick runners 32/34 and 36/38, are less susceptible to excessive wear and shear failure under heavy loading. It is particularly important to avoid failure in the front wheels 56 since a vehicle's weight will be primarily concentrated on the front wheels 56 when the support members 24 are fully elevated; if the front wheels 56 then collapse, the elevated vehicle can pitch off of the lift 10 and cause damage or injury. Since the angle members 66 support the rear wheels 58 outwardly from the base 12 in a cantilevered arrangement, the angle members 66 must be made of strong materials to avoid sagging or failure when the lift 10 is loaded.

The pivoting legs 14, 16, 18, and 20 each have opposing lower leg ends 68 which are pivotally affixed within the channels 42 and 44 by pins 70, and upper leg end 72 which are pivotally affixed to the support members 24 at pins 74. As can be seen in FIGS. 1 and 3, the pins 70 terminate in eyeloops to allow the lift 10 to be easily tied down, similarly to the pins 60. While not illustrated in the drawings, the pins 70 and 74 preferably extend directly through the base runners 32, 34, 36, and 38, but are supported within the pivoting legs 14, 16, 18, and 20 by tubular sleeve bearings. This has been found to greatly decrease wear and damage to the pivoting legs 14, 16, 18, and 20 in comparison to prior lifts wherein the pivoting legs 14, 16, 18, and 20 were directly pinned to the base 12 and support members 24.

The rear pivoting legs 14 and 18 both have the same spacing from their respective front pivoting legs 16 and 20, and all pivoting legs have the same lengths between their lower pins 70 and upper pins 74. Therefore, the first pair of pivoting legs 14 and 16 and the second pair of pivoting legs 18 and 20 each form a parallelogram linkage in conjunction with the base 12 and the support members 24. As a result, the pivoting legs 14/16 and 18/20 always remain in substantially parallel relation as the support members 24 are elevated, and the support members 24 are similarly always maintained in substantially parallel relation to the base 12. While four pivoting legs 14, 16, 18, and 20 are shown, it is also possible to use additional pivoting legs to better support the support members 24.

As noted above, the upper bridge member 22 connects the rear pivoting legs 14 and 18. Therefore, the first pair of pivoting legs 14/16 will pivot in conjunction with the second pair of pivoting legs 18/20 to maintain the support members 24 at generally the same height above the base 12. As best shown in FIGS. 2 and 3, the upper bridge member 22 between the rear pivoting legs 14 and 18 includes a pair of spaced rearwardly-extending flange-like upper pivot members 76, the purpose of which will be described at greater length below. When the rear pivoting legs 14 and 18 are oriented substantially perpendicular to the plane of the base 12, the upper pivot members 76 also extend slightly downwardly towards the plane of the base 12.

The support members 24 are each preferably U-shaped to define a longitudinal support member channel 78 wherein the upper leg ends 72 are situated and pivotally affixed via the aforementioned pins 74. Preferably, the support members 24 bear a rubber coating or another substantially non-slip surface at their tops so that vehicles placed on the support members 24 are more firmly held thereon. If desired, a platform can be extended between the support members 24 so that a single continuous surface is provided to support vehicles and the like.

It is notable that because both the lower leg ends 68 and the upper end legs 72 are pivotally mounted within channels—the lower leg ends 68 within the base channels 42 and 44, and the upper leg ends 72 within the support member channels 78 of the support members 24—the pivoting legs 14, 16, 18, and 20 provide substantially greater rigidity under loading than those in parallelogram lifts wherein pivoting legs are not supported on opposing sides (i.e., at the opposing sides through which the pivot pins extend). Greater rigidity is desirable because it helps to prevent wobbling of the support members 24 and the accidental tipping of a vehicle off of the support members 24. Rigidity is also enhanced by use of the aforementioned sleeve bearings wherein the pins 70 and 74 ride within the pivoting legs 14, 16, 18, and 20.

The linear actuator 26 may be provided by any type of actuator which expands and contracts in a linear direction, e.g., hydraulic and pneumatic cylinders. However, as best shown in FIGS. 2 and 3, the linear actuator 26 is most preferably provided by a screw actuator having a sleevelike first section 80, a second section 82 telescopically received within the first section 80, and a crank 84 which may be rotated to cause the first and second sections 80 and 82 to extend or retreat with respect to each other. Screw actuators of this type are commonly available and generally function by having one of the actuator sections 80 or 82 rotatably support a shaft attached to the crank, wherein the shaft bears a threaded portion rotatably borne by the other actuator section. The first actuator section 80 is pivotally affixed to the upper pivot members 76 of the upper bridge member 22 by means of a tubular sleeve 86, which is preferably situated adjacent the end of the first actuator section 80 from which the second actuator section 82 protrudes. A pin 88 then extends through the tubular sleeve 86, and also through the upper pivot members 76, to rotatably affix them together. As noted above, the second actuator section 82 is pivotally affixed to the central lower bridge member 48 of the base 12 by pinning it between the lower pivot members 52 by pin 54.

Owing to the foregoing arrangement, a user may load a vehicle onto the support members 24 from the front of the lift 10, stand behind the rear end 30 of the lift, and actuate the crank 84 of the linear actuator 26. As the crank 84 is actuated, the first actuator section 80 moves outwardly with respect to the second actuator section 82, thereby pushing the upper bridge member 22 away from the central lower bridge member 48. The pivoting legs 14, 16, 18, and 20 pivot upwardly from a position wherein they are substantially parallel to the base 12, away from the front end 28 of the lift 10, and toward the rear end 30 of the lift 10. As a result, the support members 24 (and any vehicle resting thereon) are elevated. When the vehicle reaches a desired height, the user may stop actuating the crank 84 and the vehicle will remain suspended on the support members 24 at this height.

The preferred vehicle lift 10 has dimensions of approximately 35 inches between the front and rear ends 28 and 30 of the base 12, and lateral dimensions of approximately 16 inches between the outermost sides of the outer runners 32 and 36. The pivoting legs 14, 16, 18, and 20 have axial lengths of approximately 19 inches, or 18¼ inches when measured between the pins 74. The upper bridge member 22 is preferably situated no more than 9 inches from the upper leg end 72 of the pivoting legs 14 and 18, and most preferably approximately 2–5 inches. The upper pivot members 76 preferably have a length of about 2¼ inches between the axis of the pin 88 and the nearest point on the upper bridge member 22. The lower pivot members 52 on the lower bridge member 48 preferably have a length of approximately 1 inch between the axis of pin 54 and the closest point on the lower bridge member 48. The support members 24 have an overall length of approximately 16 inches, wherein the pins 74 are situated approximately 42 inches apart. The wheels 56 and 58 are preferably formed of steel and have a diameter of approximately 2 inches and an axial width of approximately 1½ inches. Most components are made of tubular rectangular steel bars having a 1½ inch cross-section and ⅛ inch thick walls, but the angle members 66 used for supporting the rear wheels 58 are preferably formed of ¼ inch thick steel.

As can be ascertained from the discussion above, the upper pivot members 76 are situated on the pivoting legs 14 and 18 at points situated nearer to the upper leg ends 72 than to the lower leg ends 68, and are most preferably situated at or near the upper leg ends 72 below the support members 24. This arrangement is to be contrasted with prior lift arrangements, wherein the effective connection points between actuators and pivoting legs are situated nearer to lower leg ends. By placing the upper bridge member 22 and upper pivot members 76 nearer the upper leg ends 72 than the lower leg ends 68, greater mechanical advantage is obtained because less lifting force needs to be applied by the actuator 26 to lift a heavier load on the support members 24. Since the rated capacity of the actuator 26 (and its connections to the base 12 and pivoting legs 14/18) will primarily define the overall capacity of the lift 10, this arrangement thereby allows higher lifting capacity with the use of lighter components.

Additionally, the foregoing arrangement is believed to be particularly advantageous where the upper pivot members 76 to which the linear actuator 26 is attached extend outwardly and rearwardly from the rear pivoting legs 14 and 18, rather than pivotally affixing the linear actuator 26 directly to the upper bridge member 22. By extending the pivot point 88 outwardly, the amount of angular swing that the actuator 26 experiences during lifting is decreased, making the lift 10 easier to use. Where the aforementioned component dimensions are used, the linear actuator 26 swings from an angle near 90° from the horizontal to near 45° from the horizontal as the support members 24 vary from their lowest position to their highest position. A user therefore does not need to begin crouching as the vehicle is progressively lifted. Additionally, because the linear actuator 26 does not pivot too far from the support members 24, the user can generally grasp a vehicle on the support members 24 and steady it while actuating the crank 84 with the other hand. Further, owing to the use of the outwardly-extending upper pivot members 76, the linear actuator 26 is maintained at angles closer to 90° with respect to the rear pivoting legs 14 and 18 throughout their range of motion. The lifting force applied by the linear actuator 26 is thereby more effectively directed perpendicularly to the legs rather than along their lengths, which more effectively directs the applied force towards raising the legs 14 and 18.

It is understood that preferred embodiments of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A lift comprising:

a. a base including two pairs of runners wherein
   (1) the two pairs are spaced in generally parallel relation, and
   (2) wheels are rotatably mounted between the runners in each pair;
b. two pairs of parallel pivoting legs wherein
   (1) each pivoting leg has opposing lower and upper leg ends, and
   (2) each pivoting leg within each of the pairs of pivoting legs has its lower leg ends pivotally mounted between the runners in one of the pairs of runners;
c. two support members, each support member being pivotally linked to the upper leg ends of the pivoting legs of one of the pairs of pivoting legs;
d. an upper bridge member extending between the two pairs of pivoting legs, the upper bridge member being affixed to one pivoting leg within each of the pairs of pivoting legs; and
e. a linear actuator pivotally affixed between the upper bridge member and the base.

2. The lift of claim 1 wherein the upper bridge member is affixed to the pivoting legs closer to their upper leg ends than to their lower leg ends.

3. The lift of claim 2 wherein the upper bridge member is affixed to the pivoting legs adjacent their upper leg ends.

4. The lift of claim 1 wherein the upper bridge member includes at least one upper pivot member to which the linear actuator is pivotally affixed, and further wherein the upper pivot member extends approximately perpendicularly to a plane defined by the upper bridge member and the pivoting legs to which it is affixed, and still further wherein the upper pivot member extends approximately parallel to an axis of motion defined by the linear actuator.

5. The lift of claim 1 wherein the runners within the base extend between a forward end and a rear end, wherein a. the support members approach the base as the pivoting legs are pivoted forwardly,
b. the base further includes a lower bridge member extending between the pairs of runners, and
c. the lower bridge member bears an upwardly extending lower pivot member whereupon the linear actuator is pivotally affixed.

6. The lift of claim 1 wherein the runners within the base extend between a forward end and a rear end, wherein a. the support members approach the base as the pivoting legs are pivoted forwardly,
b. the base further includes a lower bridge member extending between the pairs of runners, and
c. the upper and lower bridge members each bear a rearwardly-extending pivot member whereupon the linear actuator is pivotally affixed.

7. The lift of claim 1 wherein the support members each include a channel wherein the pivoting legs are pivotally mounted.

8. A lift comprising:

a. a base including two pairs of runners wherein (1) the runners within each of the two pairs are spaced in generally parallel relation, thereby defining two base channels wherein one base channel is within each of the pairs, and (2) the two pairs are spaced in generally parallel relation;

b. two pairs of parallel pivoting legs wherein (1) each pivoting leg has opposing lower and upper leg ends, and (2) each of the two pairs of pivoting legs has the lower leg ends of its pivoting legs pivotally mounted within one of the base channels;

c. two support members, each support member being pivotally linked to the upper leg ends of the pivoting legs of one of the pairs of pivoting legs;

d. an upper bridge member extending between the two pairs of pivoting legs, the upper bridge member being affixed to one pivoting leg within each of the pairs of pivoting legs, and wherein the upper bridge member is affixed to the pivoting legs closer to their upper leg ends than to their lower leg ends; and e. a linear actuator pivotally affixed between the upper bridge member and the base.

9. The lift of claim 8 further including at least one wheel rotatably mounted within each base channel.

10. The lift of claim 1 wherein the upper bridge member is affixed to the pivoting legs adjacent their upper leg ends.

11. The lift of claim 8 wherein the upper bridge member includes at least one upper pivot member to which the linear actuator is pivotally affixed, and further wherein the upper pivot member extends approximately perpendicularly to a plane defined by the upper bridge member and the pivoting legs to which it is affixed, and still further wherein the upper pivot member extends approximately parallel to an axis of motion defined by the linear actuator.

12. The lift of claim 8 wherein the runners within the base extend between a forward end and a rear end, wherein a. the support members approach the base as the pivoting legs are pivoted forwardly, b. the base further includes a lower bridge member extending between the pairs of runners, and c. the lower bridge member bears an upwardly extending lower pivot member whereupon the linear actuator is pivotally affixed.

13. The lift of claim 12 wherein the linear actuator is pivotally affixed to the lower pivot member at a pivot point situated above a plane defined at the top of the runners.

14. The lift of claim 8 wherein the runners within the base extend between a forward end and a rear end, wherein a. the support members approach the base as the pivoting legs are pivoted forwardly, b. the base further includes a lower bridge member extending between the pairs of runners, and c. the upper and lower bridge members each bear a rearwardly-extending pivot member whereupon the linear actuator is pivotally affixed.

15. The lift of claim 8 wherein the support members each include a channel wherein the pivoting legs are pivotally mounted.

16. A lift comprising:

a. a base including two pairs of runners extending between a forward end and a rear end wherein (1) the runners within each of the two pairs are spaced in generally parallel relation, thereby defining two base channels wherein one base channel is within each of the pairs, (2) each base channel includes at least one wheel rotatably mounted therein, and (3) the base further includes a lower bridge member extending between the pairs of runners, the lower bridge member including an rearwardly extending base pivot member thereon;

b. two pairs of pivoting legs wherein (1) each pivoting leg has opposing lower and upper leg ends, and (2) each of the two pairs of pivoting legs has the lower leg ends of its pivoting legs pivotally mounted within one of the base channels;

c. two support members, each support member being pivotally linked to the upper leg ends of the pivoting legs of one of the pairs of pivoting legs;

d. an upper bridge member extending between the two pairs of pivoting legs wherein (1) the upper bridge member is affixed to two pivoting legs, each of these pivoting legs being included within one of the pairs of pivoting legs, (2) the upper bridge member is affixed closer to the upper leg ends of these pivoting legs than to their lower leg ends, and (3) the upper bridge member includes a rearwardly-extending upper pivot member thereon;

e. a linear actuator pivotally affixed to the upper pivot member of the upper bridge member and the lower pivot member of the lower bridge member.

17. The lift of claim 16 wherein the upper bridge member is affixed to the pivoting legs adjacent their upper leg ends.

18. The lift of claim 8 wherein the upper pivot member extends approximately perpendicularly to a plane defined by the upper bridge member and the pivoting legs to which it is affixed, and still further wherein the upper pivot member extends approximately parallel to an axis of motion defined by the linear actuator.

19. The lift of claim 16 wherein the support members each include a channel wherein the pivoting legs are pivotally mounted.

* * * * *